(12) United States Patent
Sakamoto

(10) Patent No.: US 6,979,476 B2
(45) Date of Patent: Dec. 27, 2005

(54) FILTER MEMBER MANUFACTURING METHOD, FILTER MEMBER CUTTING METHOD, FILTER CHIP CUTTING METHOD, AND FILTER CHIP MANUFACTURING METHOD

(75) Inventor: Misao Sakamoto, Zama (JP)

(73) Assignee: Nikon Corporation, Tokyo (JP)

( * ) Notice: Subject to any disclaimer, the term of this patent is extended or adjusted under 35 U.S.C. 154(b) by 456 days.

(21) Appl. No.: 10/297,714

(22) PCT Filed: Aug. 28, 2001

(86) PCT No.: PCT/JP01/07325

§ 371 (c)(1),
(2), (4) Date: Dec. 9, 2002

(87) PCT Pub. No.: WO02/31545

PCT Pub. Date: Apr. 18, 2002

(65) Prior Publication Data

US 2004/0021968 A1 Feb. 5, 2004

(30) Foreign Application Priority Data

Oct. 10, 2000 (JP) .............................. 2000-308945

(51) Int. Cl.[7] .......................... C23C 16/00; B05D 3/12
(52) U.S. Cl. ...................... 427/289; 427/293; 427/162; 427/164; 427/165; 427/166; 264/1.1; 204/192.26
(58) Field of Search ...................... 204/192.26, 192.27, 204/192.28, 298.11; 427/126.2, 108, 109, 427/162, 164, 165, 166, 289, 293; 264/1.1, 264/1.21, 1.31, 1.32, 1.34, 1.7; 359/886, 359/890, 581, 852, 586

(56) References Cited

U.S. PATENT DOCUMENTS 4,325,083 A * 4/1982 Rouchon et al. ............ 348/362

FOREIGN PATENT DOCUMENTS

JP 59-56577 A 4/1984

(Continued)

OTHER PUBLICATIONS

Machine Translation of Japan 2000-047027.*

Primary Examiner—Rodney G. McDonald
(74) Attorney, Agent, or Firm—Morgan, Lewis & Bockius LLP

(57) ABSTRACT

A plurality of filter members on which filter films with good characteristics are formed in a more or less circular arc form pattern are obtained by producing a filter member in which all of an annular filter film with good characteristics is formed on the surface of a single glass substrate, and then cutting this filter member through the center of the annular shape of the filter film. A plurality of small filter member pieces 140, 140, . . . are obtained by cutting the filter members obtained by the above-mentioned division in the direction perpendicular to the chords of the circular arcs; then, the small filter member pieces are rearranged so that the filter films 120a, 120a, . . . with good characteristics on the small filter member pieces are lined up in a more or less rectilinear pattern. The desired filter chips are then obtained by cutting these rearranged small filter member pieces in the direction perpendicular to the initial cutting direction. Furthermore, in cases where the filter films are optical multi-layer films, the filter members are placed on the stage so that the filter films are on the upper surface, and cutting is accomplished by downcutting using a dicing saw.

5 Claims, 15 Drawing Sheets

FOREIGN PATENT DOCUMENTS

| | | |
|---|---|---|
| JP | 63-60404 A | 3/1988 |
| JP | 9-205071 A | 8/1997 |
| JP | 2000-047027 * | 2/2000 |
| JP | 2000-47027 A | 2/2000 |

* cited by examiner

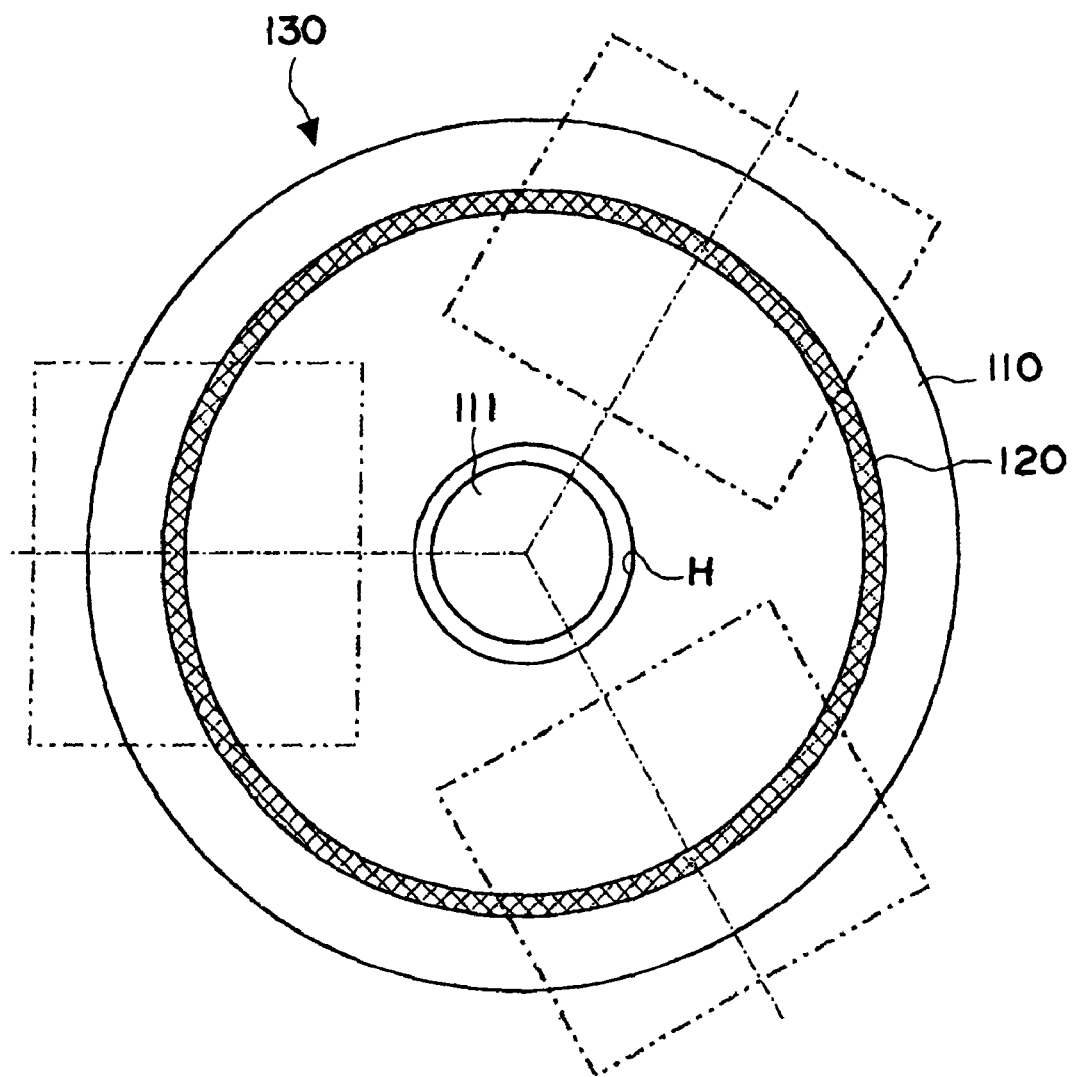
図 1 2

図13
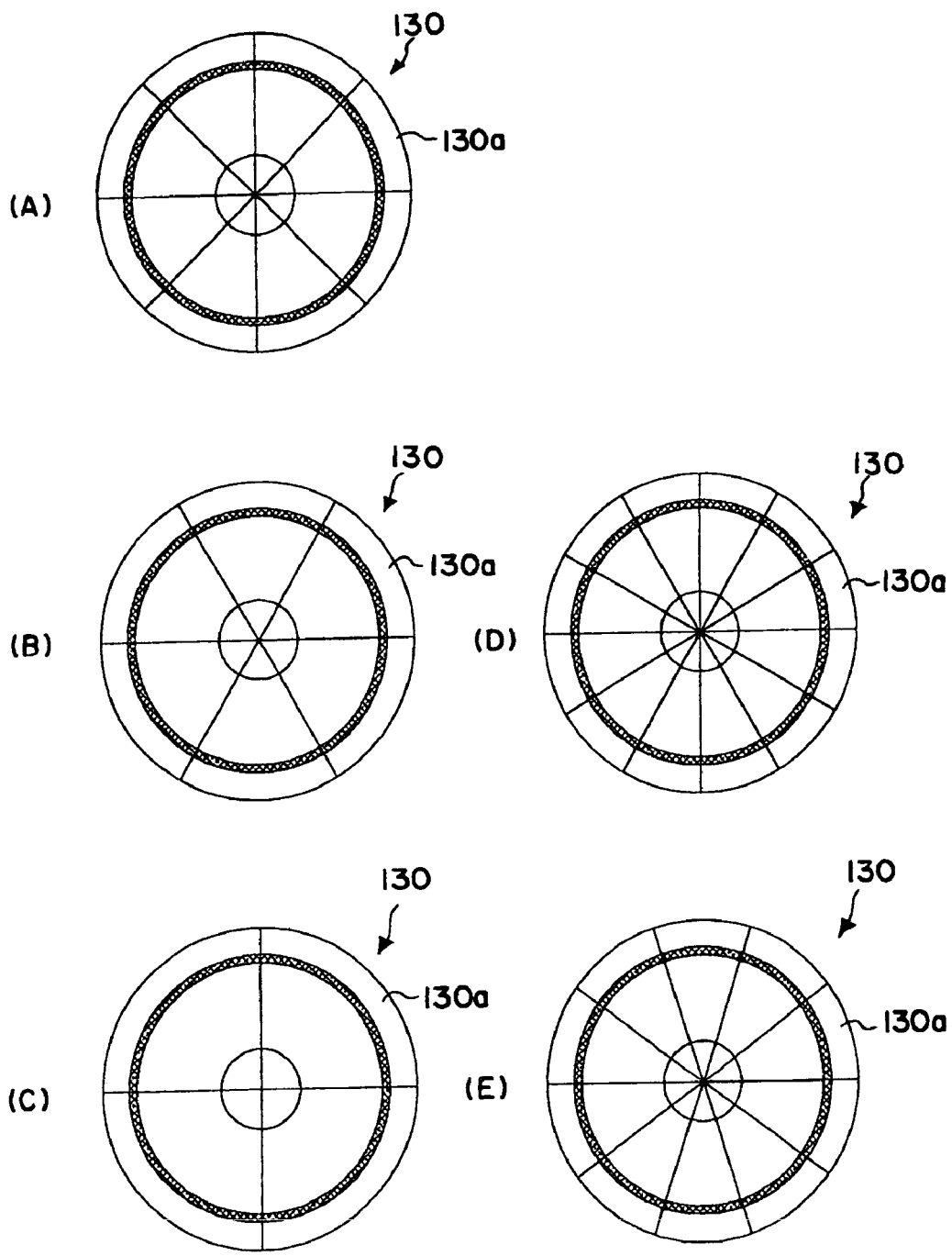

図14
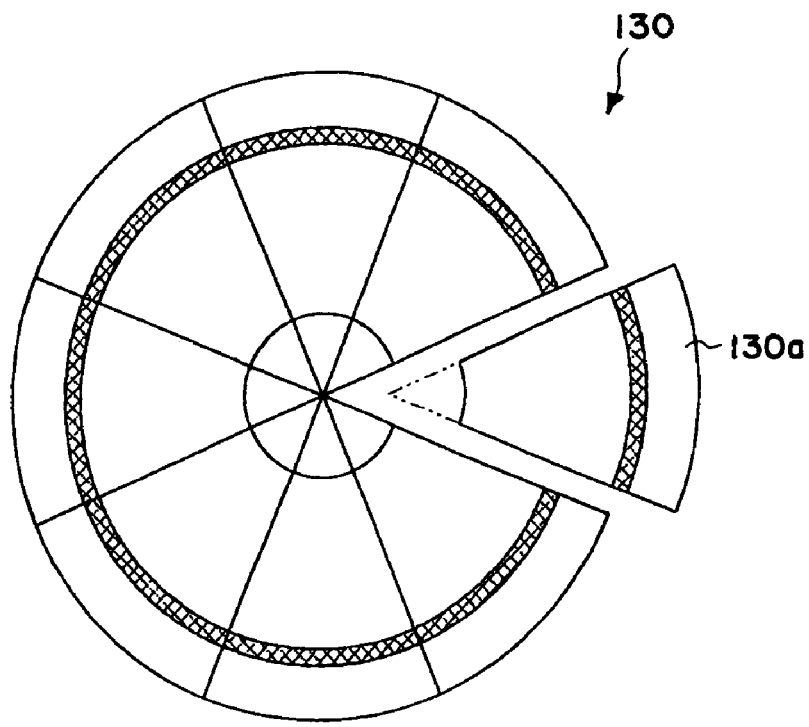
図15
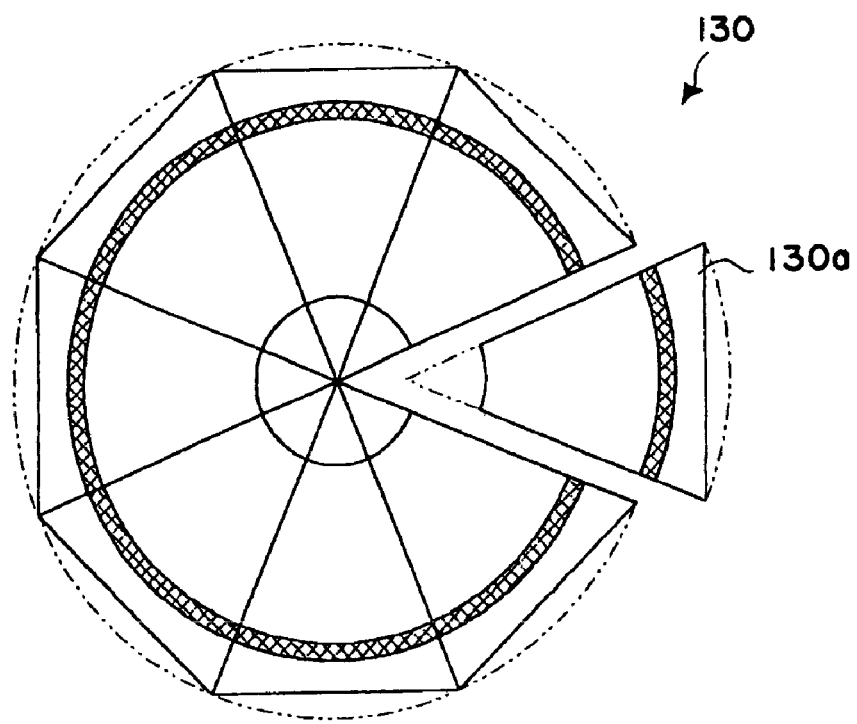

図16
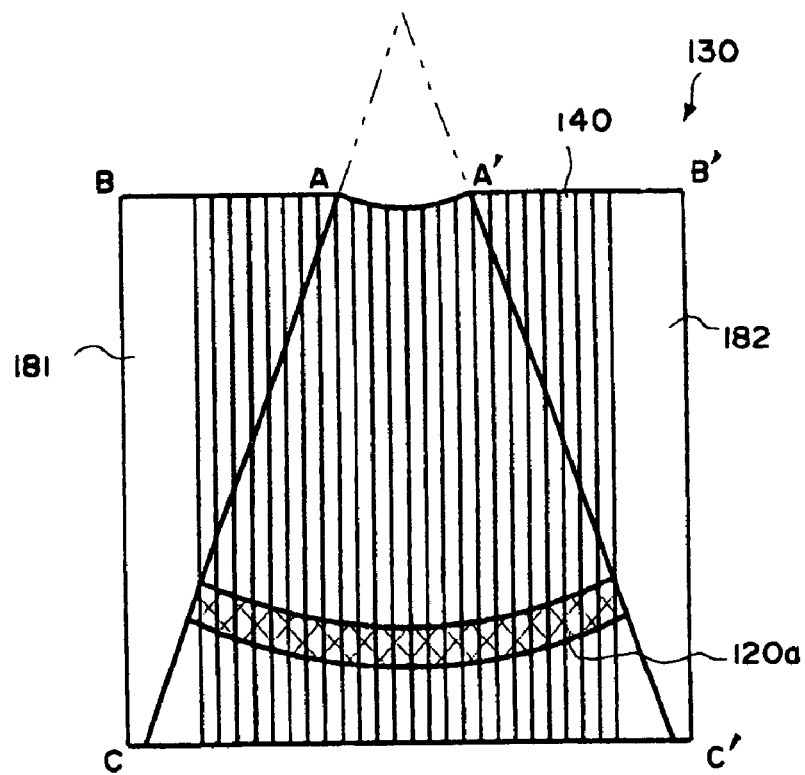
図17
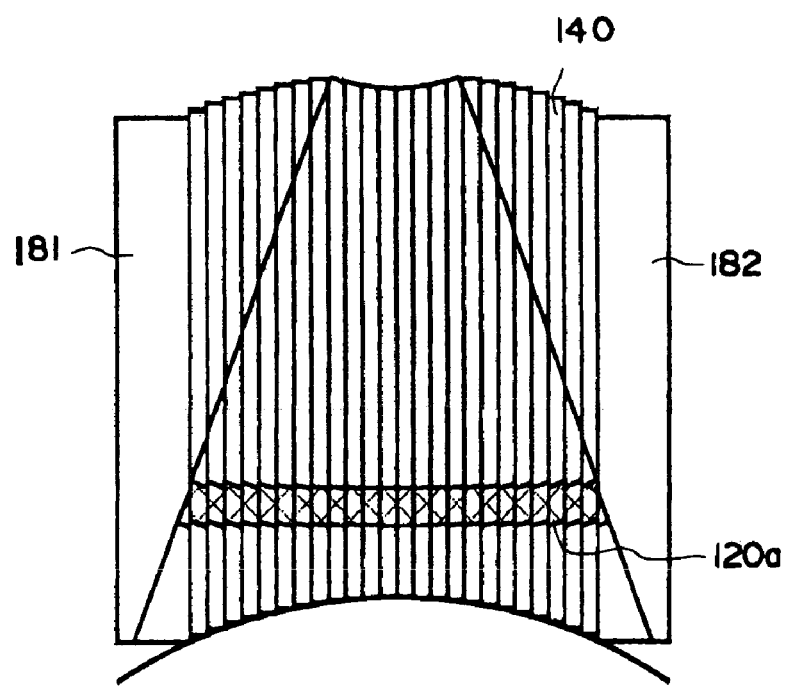

図18
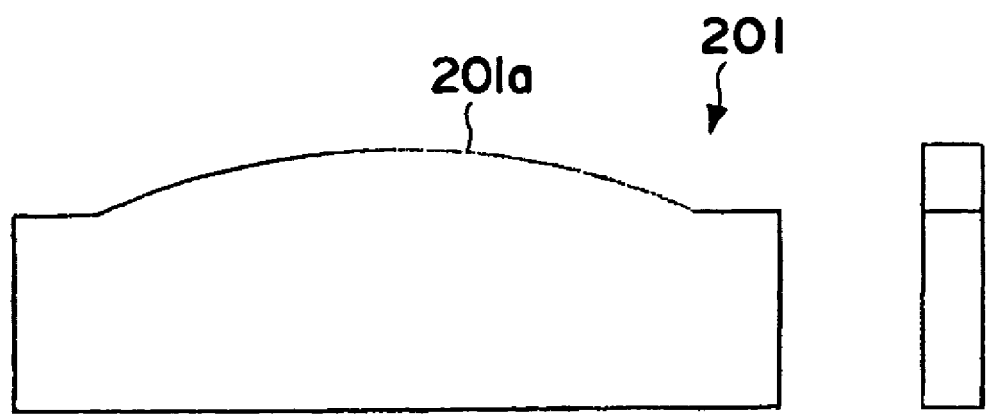

図 1 9
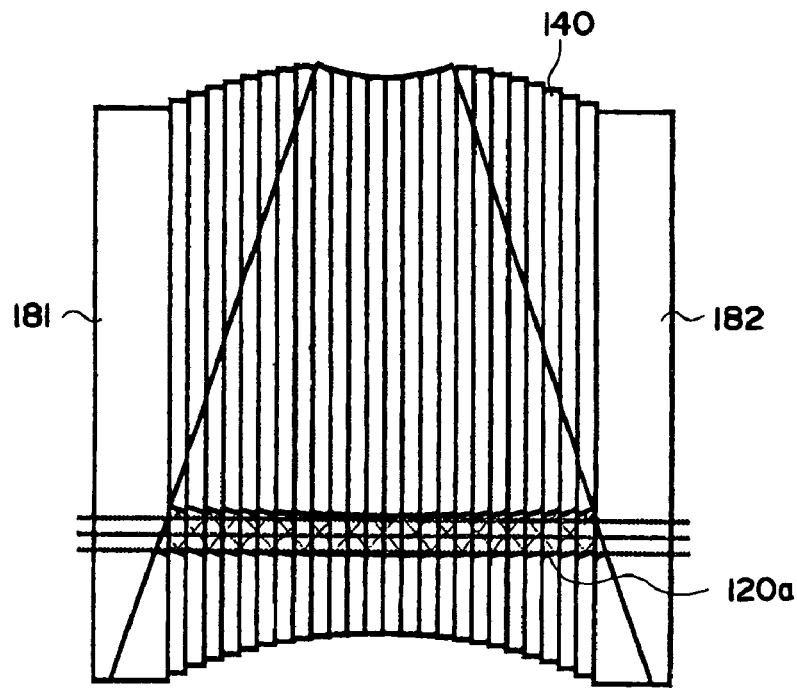
図 2 0
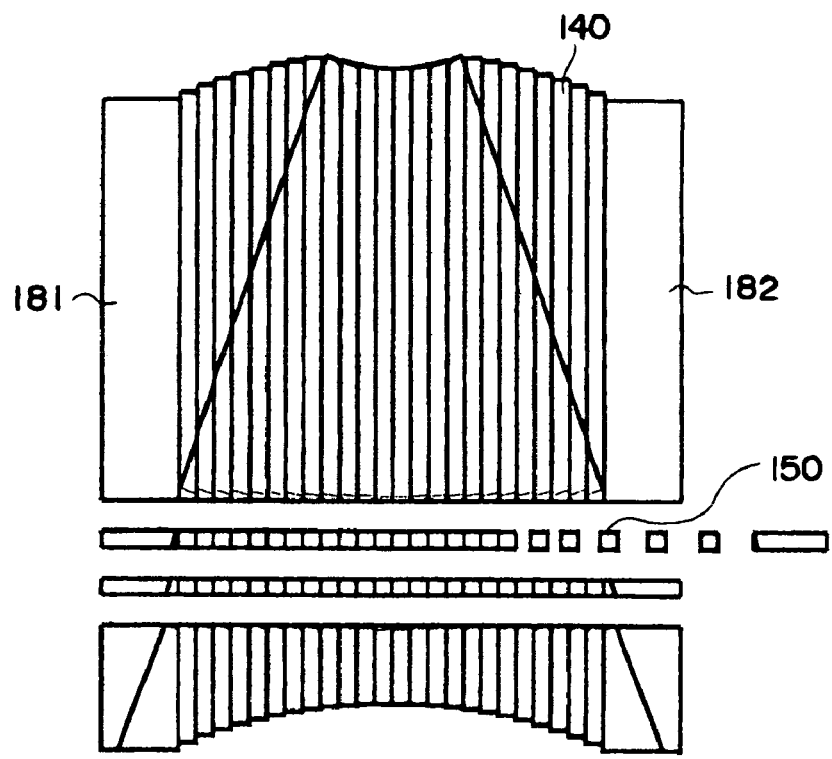

図 2 1
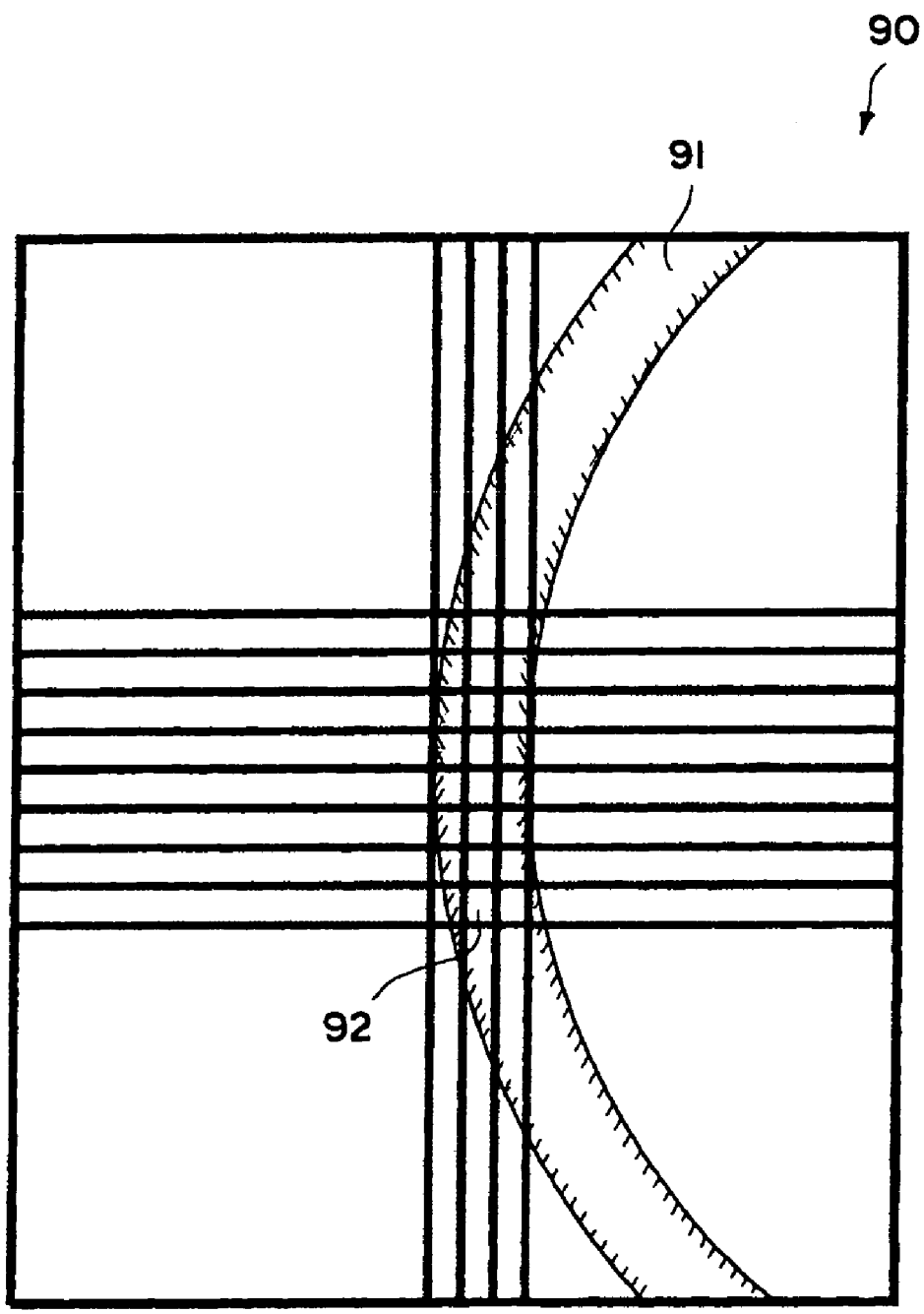

FILTER MEMBER MANUFACTURING METHOD, FILTER MEMBER CUTTING METHOD, FILTER CHIP CUTTING METHOD, AND FILTER CHIP MANUFACTURING METHOD

TECHNICAL FIELD

The present invention relates to a method for manufacturing filter chips used in optical communications, etc., a filter member cutting method, a filter chip cut-out method and a filter chip manufacturing method.

BACKGROUND TECHNOLOGY

Recently, as a result of the spread of internet communications, etc., the quantity of information communicated via communications lines has been increasing, and there has been a demand for improved productivity in optical filters used in the optical fibers that constitute the mainstream of current communications lines. The filter chips that constitute the source of such optical filters are obtained by using a dicing saw, etc., to cut filter members in which a filter film is formed on the surface of a glass substrate to the required dimensions.

The formation of such filter films on glass substrates is accomplished inside a film forming apparatus such as a sputtering apparatus, etc. Various types of such film forming apparatuses are known; apparatuses in which film formation is performed with a plurality of rectangular glass substrates attached to a rotating substrate holder include apparatuses in which the portion of the filter film present on the filter member 90 being manufactured that has good characteristics, i.e., a filter film 91 with good characteristics, is formed in a circular arc form pattern as shown in FIG. 21. Furthermore, a plurality of the desired filter chips 92 can be obtained by cutting the filter member 90 thus obtained so that the above-mentioned filter film 91 with good characteristics is divided into a checkerboard pattern as shown in FIG. 21.

In recent years, furthermore, wavelength division multiplexing (WDM communications system: wavelength division multiplexing communications system) which is a technique that easily allows an increase in the communications capacity among optical communications techniques has begun to be used. In the field of this WDM communications system, optical multi-layer film filters used as optical filters that split light in the near infrared region used for communications into a plurality of narrow wavelength regions, and synthesize the light of this plurality of wavelength regions, have attracted attention.

However, in cases where filter members are cut so that the filter film with good characteristics that is present in a circular arc form pattern is split into a checkerboard pattern as described above, there are many wasted portions that cannot be cut out into filter chips even though the characteristics are good, so that the number of filter chips obtained is small, and the yield is poor. Furthermore, in cases where the filter film that is formed on the glass substrate is an optical multi-layer film of the above-mentioned type, this optical multi-layer film is thicker than a conventional filter film; as a result, there have been cases in which chipping, cracking or peeling of the film occurs when cutting is performed using a dicing saw. In the past, therefore, it has been necessary to use a working method in which an optical multi-layer film is formed on glass substrates that have been cut to the required dimensions beforehand, so that the productivity of optical multi-layer film filters has not been very good.

DISCLOSURE OF THE INVENTION

The present invention was devised in light of the above-mentioned problems; it is an object of the present invention to provide a filter member manufacturing method, filter member cutting method, filter chip cut-out method and filter chip manufacturing method that make it possible to increase the productivity of optical filters, including optical multi-layer film filters.

The first invention that is used to achieve the above-mentioned object is a filter member manufacturing method in which a filter member is obtained by forming a filter film which has desired characteristics on a substrate using a film forming apparatus in which such a filter film is formed in an annular shape, wherein the method is arranged so that the above-mentioned filter member is obtained by positioning a substrate throughout the entire region where the above-mentioned filter film that has desired characteristics is formed.

In the case of such a method, as is indicated by the concrete example shown in FIG. 12 below, a filter film which has desired characteristics (e.g., a filter film with good characteristics) can be formed in greater quantities in a single film formation process than in the case of a conventional method in which a filter film is formed with a plurality of rectangular substrates arranged in a circular pattern with gaps between the substrates. Accordingly, a greater number of filter chips can be obtained than is possible in the case of a conventional method, so that the yield is improved.

The second invention that is used to achieve the above-mentioned object is a method for cutting a filter member in which a filter film consisting of an optical multi-layer film is formed on one side of a substrate, wherein the above-mentioned filter member is placed on a base stand so that the above-mentioned filter film constitutes the upper surface of the filter member, and the above-mentioned filter member is cut by downcutting using a dicing saw.

In the case of parts in which the filter film is an optical multi-layer film, and especially in the case of parts in which numerous layers are formed as in an optical communications filter, chipping, cracking and peeling, etc., of the filter film tend to occur during cutting. However, if a method of the above-mentioned type is used, the filter member can be cut without causing such chipping, cracking or peeling, etc. Accordingly, a production process can be employed in which a filter member is manufactured by forming an optical multi-layer film on a substrate, after which filter chips are obtained by cutting the chips from this filter member, so that the productivity of optical multi-layer film filters can be greatly improved.

The third invention that is used to achieve the above-mentioned object is a method for cutting a filter member in which a filter film consisting of an optical multi-layer film is formed on one side of a substrate, and a film member consisting of a smaller number of laminated layers than the above-mentioned filter film is formed on the other side of the above-mentioned substrate, wherein the above-mentioned filter member is placed on a base stand so that the above-mentioned filter film constitutes the upper surface of the filter member, and the above-mentioned filter member is cut by downcutting using a dicing saw.

In this method as well, cutting of the filter member can be performed without causing chipping, cracking or peeling, etc., in the case of parts in which the filter film is an optical multilayer film, and especially in the case of parts in which numerous layers are formed as in an optical communications filter. Accordingly, a production process can be employed in which a filter member is manufactured by forming an optical multi-layer film on a substrate, after which filter chips are obtained by cutting the chips from this filter member, so that the productivity of optical multi-layer film filters can be greatly improved.

The fourth invention that is used to achieve the above-mentioned object is a filter chip cut-out method in which a plurality of filter chips are cut out from a filter member in which the portion of the filter film formed on the substrate that has desired characteristics is a more or less circular arc form region, this filter chip cut-out method comprising a first step in which a plurality of small filter member pieces are obtained by cutting the above-mentioned filter member in the direction perpendicular to the chord of the above-mentioned circular arc, a second step in which the above-mentioned plurality of small filter member pieces are rearranged so that the portions of the above-mentioned plurality of small filter member pieces that correspond to the above-mentioned circular arc form region are lined up in a more or less rectilinear pattern, and a third step in which a plurality of filter chips are obtained by cutting the above-mentioned rearranged plurality of small filter member pieces in the direction perpendicular to the direction of cutting in the above-mentioned first step.

In the case of such a method, a larger number of filter chips can be cut out from the filter member in which a filter film with desired characteristics (a filter film with good characteristics) is present in a more or less circular arc form pattern; accordingly the productivity of the filter chips is improved compared to conventional methods.

The fifth invention that is used to achieve the above-mentioned object is the above-mentioned fourth invention, wherein the above-mentioned rearrangement of the above-mentioned small filter member pieces is performed in the above-mentioned second step using a tool which has a projecting or recessed part that has more or less the same curvature radius as the curvature radius in the above-mentioned circular arc form region.

If the method is devised so that the above-mentioned rearrangement of the small filter member pieces is performed in the above-mentioned second step using a tool which has a projecting or recessed part that has more or less the same curvature radius as the curvature radius in the above-mentioned circular arc form region, the rearrangement of the small filter pieces is facilitated, so that the productivity is increased even further.

The sixth invention that is used to achieve the above-mentioned object is a filter chip manufacturing method which comprises a first step in which a filter member is obtained using a film forming apparatus in which a filter film that has desired characteristics is formed in an annular shape, with a substrate being positioned throughout the entire region in which the above-mentioned filter film that has desired characteristics is formed, a second step in which the above-mentioned filter member including at least a portion of the annular region constituting the above-mentioned filter film that has desired characteristics is cut through the center of the curvature radius of the above-mentioned annular region so that the filter member is divided into a plurality of filter members in which the above-mentioned filter film that has desired characteristics is present in more or less a circular arc form pattern, a third step in which a plurality of small filter member pieces are obtained by cutting the above-mentioned filter members obtained in the above-mentioned second step in the direction perpendicular to the chord of the above-mentioned circular arc, a fourth step in which the above-mentioned plurality of small filter member pieces are rearranged so that the portions of the above-mentioned plurality of small filter member pieces that correspond to the above-mentioned circular arc form region are lined up in a more or less rectilinear pattern, and a fifth step in which a plurality of filter chips are obtained by cutting the above-mentioned rearranged plurality of small filter member pieces in the direction perpendicular to the cutting direction in the above-mentioned third step.

In this filter chip manufacturing method, a filter film that has desired characteristics (i.e., a filter film with good characteristics) can be formed in greater quantities by means of a single film formation process than is possible in conventional methods; furthermore, a larger number of filter chips can be cut out from the filter member thus obtained, so that the yield can be greatly improved compared to a conventional method.

The seventh invention that is used to achieve the above-mentioned object is the above-mentioned sixth invention, wherein the above-mentioned substrate has a more or less disk-form shape.

If the above-mentioned substrate has a more or less circular shape, then the waste portion that is cut away by cutting can be reduced from the outset, so that the manufacturing cost can be lowered.

The eighth invention that is used to achieve the above-mentioned object is the above-mentioned sixth invention or seventh invention, wherein the above-mentioned rearrangement of the above-mentioned small filter member pieces is performed in the above-mentioned fourth step using a tool which has a projecting or recessed part that has more or less the same curvature radius as the curvature radius of the above-mentioned circular arc form region.

If the method is devised so that the above-mentioned rearrangement of the small filter member pieces is performed in the above-mentioned fourth step using a tool which has a projecting or recessed part that has more or less the same curvature radius as the curvature radius of the above-mentioned circular arc form region, the rearrangement of the small filter member pieces is facilitated, so that the productivity is improved even further.

In the filter member manufacturing method of the present invention, as was described above, a filter film that has desired characteristics (a filter film with good characteristics) can be formed in greater quantities by means of a single film formation process than is possible in the case of a conventional method in which a filter film is formed with a plurality of rectangular substrates disposed in circular pattern with gaps between the substrates. As a result, a filter member can be obtained, so that a greater number of filter chips can be cut out, thus improving the yield.

Furthermore, in the filter member cutting method of the present invention, the filter member can be cut without causing chipping, cracking or peeling, etc., of the filter film; accordingly, a production process can be employed in which a filter member is manufactured by forming an optical multi-layer film on a substrate, after which filter chips are obtained by cutting these chips from this filter member, so that the productivity of optical multi-layer film filters is greatly improved.

Moreover, in the filter chip cut-out method of the present invention, a greater number of filter chips can be cut out from the filter member in which a filter film that has desired characteristics (a filter film with good characteristics) is present in a more or less circular arc form pattern; accordingly, the productivity of filter chips is improved compared to conventional methods.

In addition, in the filter chip manufacturing method of the present invention, a filter film that has desired characteristics (a filter film with good characteristics) can be formed in greater quantities by means of a single film formation process than is possible in the case of a conventional method, and a greater number of filter chips can be cut out from the filter member obtained in this manner, so that the yield can be greatly improved compared to conventional methods.

BRIEF DESCRIPTION OF THE DRAWINGS

FIG. 9(A) shows a state in which a plurality of small filter member pieces have been obtained by cutting the filter member, and FIG. 9(B) shows a state in which the compressed small filter member pieces have been rearranged using the tool shown in FIG. 8.

FIG. 12 is a diagram which shows how an entire annular filter film with good characteristics is formed on the surface of a single glass substrate.

FIG. 13 shows how a disk-form filter member is cut; FIG. 13(A) shows a case of cutting into 8 equal parts, FIG. 13(B) shows a case of cutting into 6 equal parts, FIG. 13(C) shows a case of cutting into 4 equal parts, FIG. 13(D) shows a case of cutting into 12 equal parts, and FIG. 13(E) shows a case of cutting into 10 equal parts.

FIG. 14 is a diagram which shows how new filter members are obtained by cutting a disk-form filter member into 8 equal parts.

FIG. 15 is a diagram which shows how the outer circumferential portions of the filter members are cut away.

FIG. 16 is a diagram which shows how small filter member pieces are obtained by cutting the filter members in the direction perpendicular to the chord that connects both ends of the circular arc form portion of the filter film with good characteristics in each filter member.

FIG. 17 is a diagram showing a state in which the filter members have been rearranged so that the filter films with good characteristics in the small filter member pieces are lined up in a more or less rectilinear pattern.

FIG. 18 is a diagram which shows an example of the tool used to rearrange the small filter member pieces.

FIG. 19 is a diagram which shows how the small filter member pieces that have been rearranged and re-bonded are cut in the direction perpendicular to the cutting direction used in the initial cutting process.

FIG. 20 is a diagram which shows how filter chips in which a filter film with good characteristics is used as the filter part are obtained.

FIG. 21 is a diagram illustrating a conventional method in which filter chips are obtained by cutting the filter member so that the filter film with good characteristics formed on the glass substrate is divided into a checkerboard pattern.

BEST MODE FOR CARRYING OUT THE INVENTION

Embodiments that are thought to be the best for working the present invention will be described below. However, it goes without saying that these embodiments do not limit the scope of the present invention. Here, respective examples of the filter member manufacturing method, filter member cut-out method, filter chip cut-out method and filter chip manufacturing method of the present invention will be described while describing a process in which filter chips are obtained from a filter member obtained by forming a filter film on a glass substrate.

Figure 1:
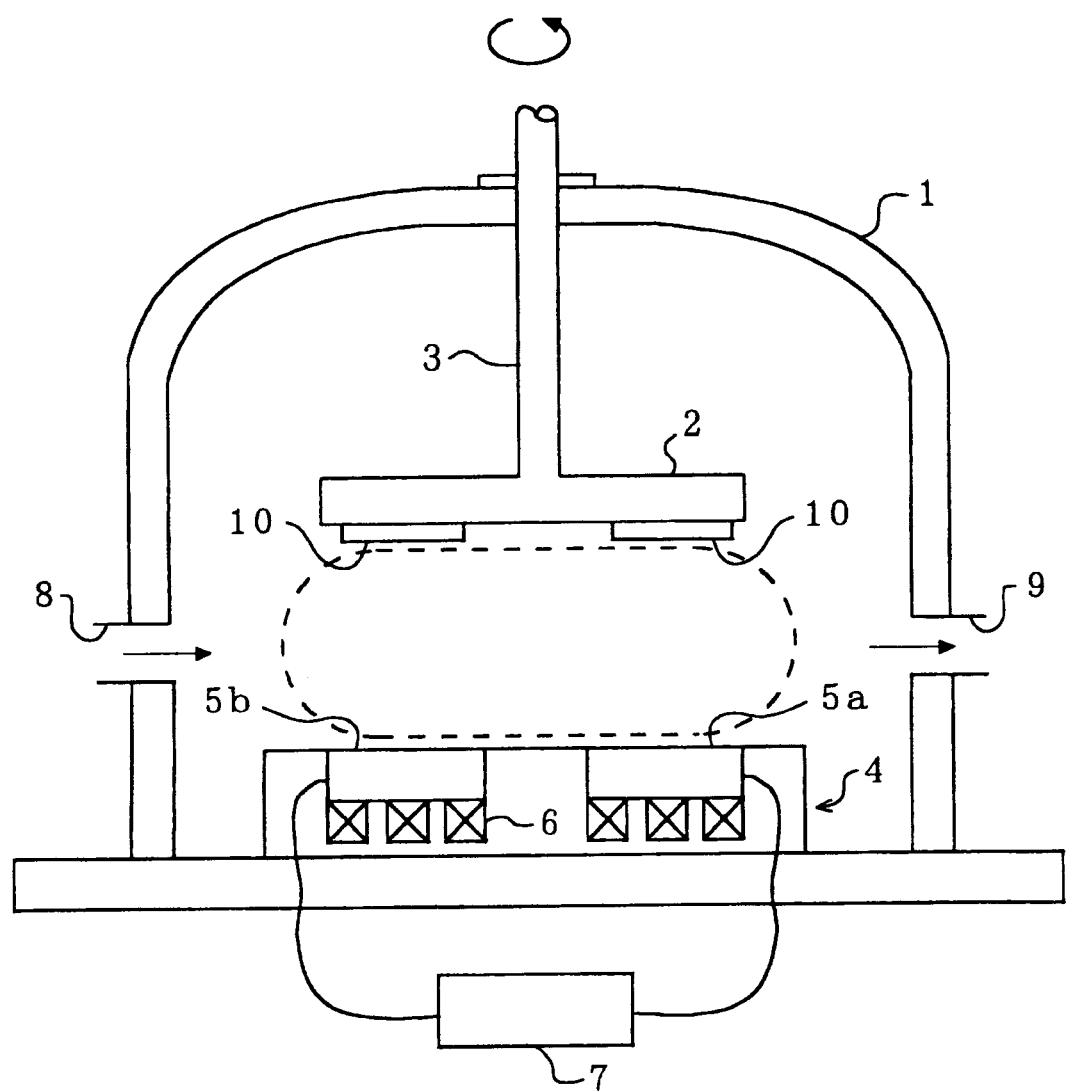
FIG. 1 is a structural diagram of one example of a filter member manufacturing apparatus used in a filter member manufacturing method.
Figure 2:
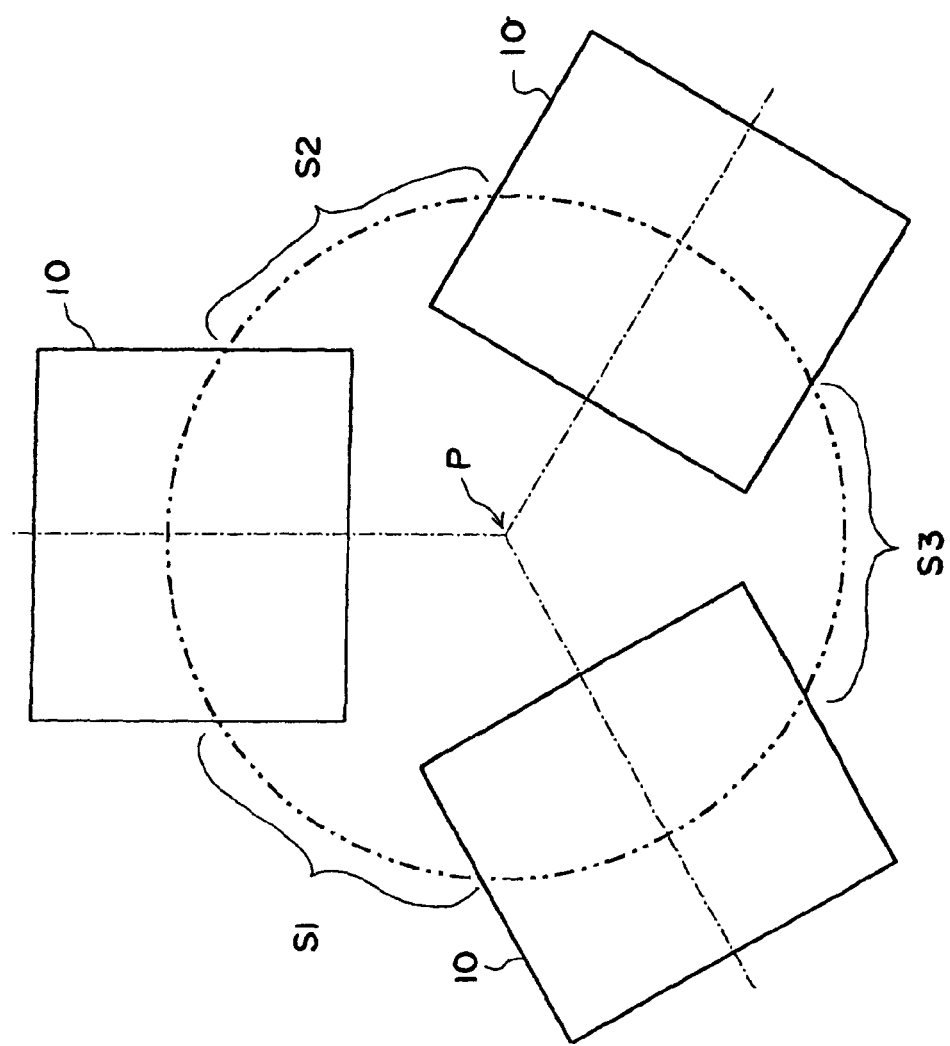
FIG. 2 is a diagram which shows how a plurality of rectangular glass substrates are disposed in the above-mentioned filter member manufacturing apparatus.

FIG. 1 shows one example of a filter member manufacturing apparatus (film forming apparatus) in which a filter member is manufactured by forming a filter film on a glass substrate. This manufacturing apparatus has a disk-form substrate holder 2 disposed inside a dome-form vacuum chamber 1; the substrate holder 2 can be caused to rotate about a rotating shaft 3 by driving this rotating shaft 3 by means of a motor (not shown in the figures). A plurality of glass substrates 10 (three substrates in this case) are attached to the undersurface of the substrate holder 2 in a concentric circular pattern as shown in FIG. 2 centered on the center of rotation P of the substrate holder 2 (i.e., the central axis of the rotating shaft 3). A sputtering apparatus 4 is disposed in the lower part of the vacuum chamber 1, and the system is arranged so that a film can be formed on the surfaces of the glass substrates 10 by causing particles of the film components to fly from this sputtering apparatus 4.

Two sputtering sources 5a and 5b are installed in the sputtering apparatus 4, and a plurality of exciting members 6 are installed in the respective lower parts of these sputtering sources 5a and 5b. A high-frequency power supply 7 which oscillates at approximately 40 kHz is connected to both of the sputtering sources 5a and 5b. When the voltage that is output from this high-frequency power supply 7 is applied to the sputtering sources 5a and 5b, a discharge occurs between the vacuum chamber 1 and the sputtering sources 5a and 5b.

Furthermore, argon gas and oxygen are introduced into the interior of the vacuum chamber 1 from a gas introduction port 8 (these gases are discharged via gas discharge port 9), so that a plasma of argon gas is formed between the glass substrates 10 and the sputtering sources 5a and 5b. Then, when either of the sputtering sources 5a and 5b has a minus potential, the argon gas strikes the sputtering source 5a or 5b so that sputtering is caused to occur, thus forming a film on the glass substrates 10.

Furthermore, the particles that fly from the sputtering sources 5a and 5b combine with the oxygen gas inside the vacuum chamber 1, and reach the glass substrates 10 in an oxidized state. In this way, filter members are manufactured in which a filter film is formed on the glass substrates 10.

Here, one of the glass substrates 10 held on the substrate holder 2 is used as a monitoring glass for monitoring purposes. This monitoring glass is installed in order to control the thickness of the filter films that are formed on the glass substrates 10; the thickness of the filter films formed on the glass substrates 10 is estimated on the basis of the thickness of the filter film that is formed on this monitoring glass.

Figure 3:
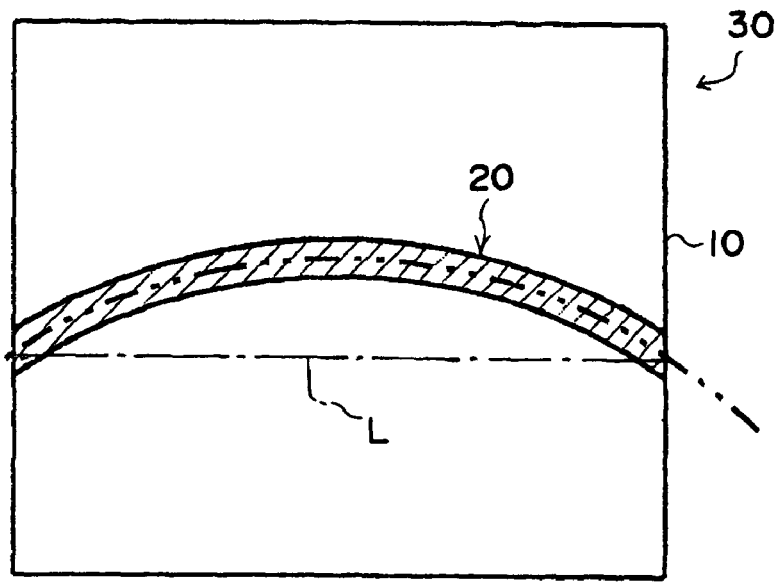
FIG. 3 is a diagram which shows a filter member in which a filter film that has good characteristics is formed in a more or less circular arc form pattern (in a bow shape) on a glass substrate.

The thickness of the filter films that are formed on the surfaces of the glass substrates 10 by the above-mentioned process has a concentric-circular distribution that is centered on the center of the substrate holder 2, so that a filter film 20 with good characteristics is formed in a more or less circular arc form pattern (in a bow shape) on the surface of each glass substrate 10 (see FIG. 3). The positions and shapes (more or less circular arc form shapes) of these filter films 20 with good characteristics are determined by measuring the spectroscopic transmissivity characteristics in lattice squares that are approximately 2 mm on a side for the entire region of the respective filter films formed on the glass substrates 10, preparing a map that connects portions having the same characteristics, and then analyzing the coordinate positions and curvature radii of the portions of the filter films that have good characteristics.

Figure 4:
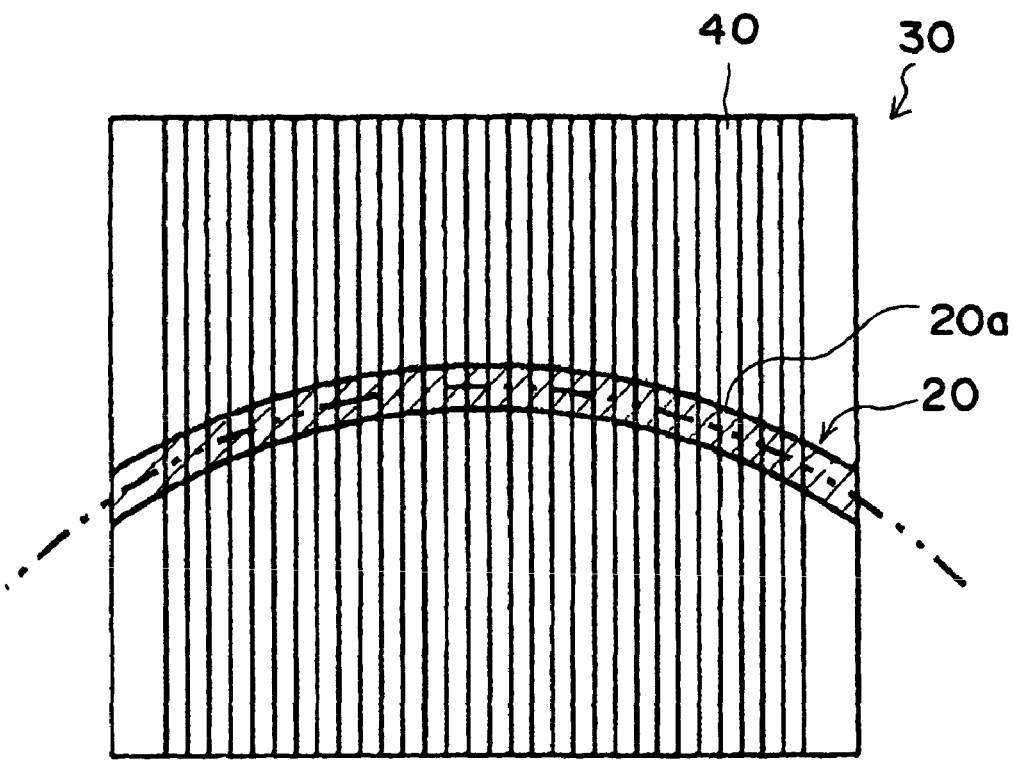
FIG. 4 is a diagram which shows how small filter member pieces are obtained by cutting the filter member in the direction perpendicular to the chord that connects both ends of the circular arc form part of the filter film with good characteristics.

When the positions and shapes of the filter films 20 having good characteristics have thus been determined, a plurality of small filter member pieces 40, 40, . . . constituting the required quantity of small filter member pieces are obtained by cutting the filter members 30 to the required dimensions in the direction perpendicular to the chord (line segment L indicated by a one-dot chain line in FIG. 3) connecting both ends of the circular arc form portion of each filter film 20 having good characteristics as shown in FIG. 4. In FIG. 4, 20a indicates the filter films with good characteristics in the small filter member pieces 40 thus obtained.

Figure 5:
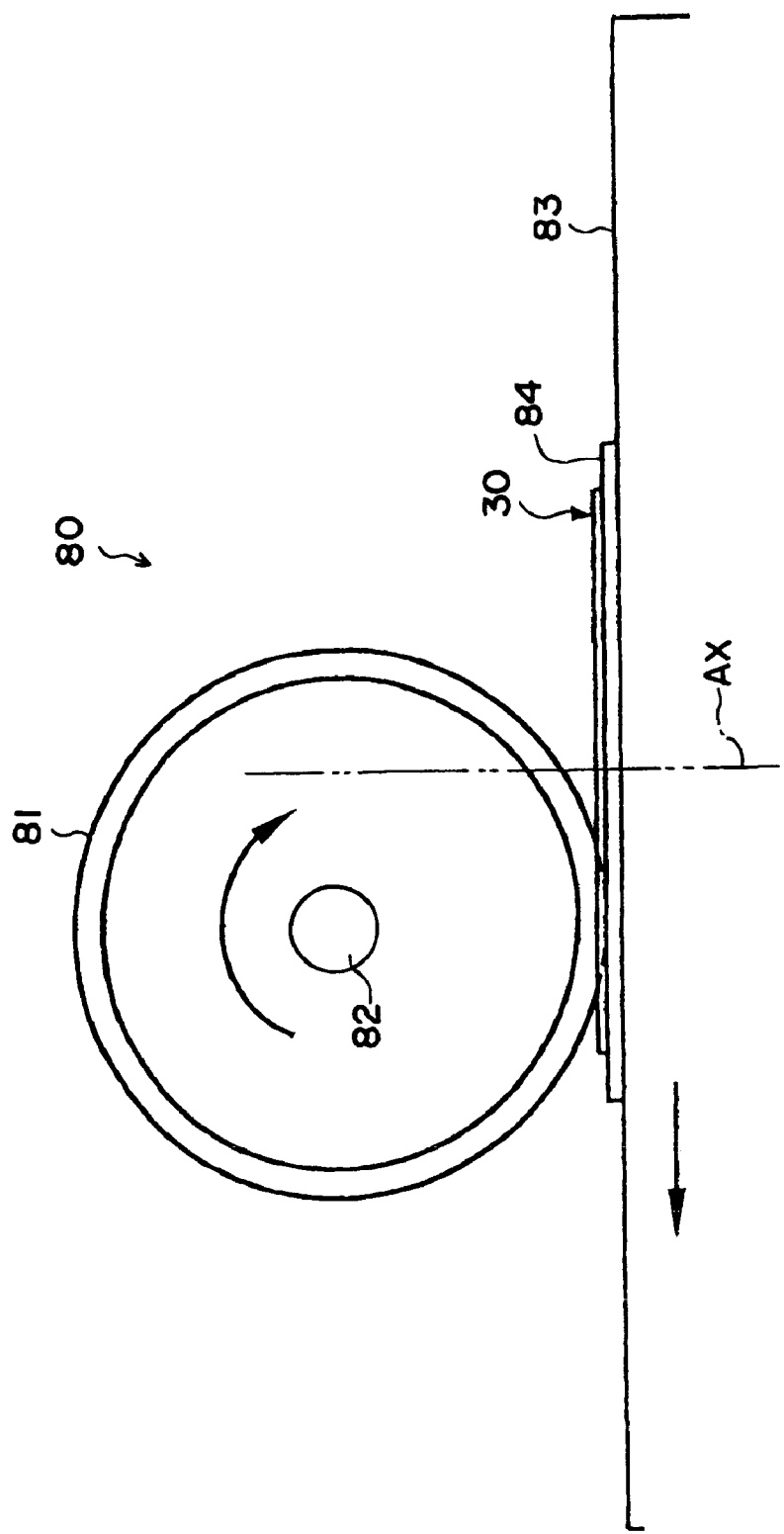
FIG. 5 is a side view of one example of a dicing saw used to cut the filter member.

FIG. 5 shows one example of a dicing saw 80 used to cut the above-mentioned filter members 30. This dicing saw 80 is a blade saw which has a blade 81 that is an ultra-thin circular blade, and is constructed so that the blade 81 is caused to rotate by driving a rotating shaft 82 by means of a motor (not shown in the figures). Generally, the diameter of the blade 81 is approximately 50 mm to 150 mm, and the thickness is approximately 0.03 mm to 2 mm. A blade that is used in most cases is a so-called metal-bond diamond blade using a material obtained by the mixed sintering of various type of metal powders consisting chiefly of bronze as a binder, or a so-called resin-bond diamond blade using a resin component such as a phenol resin or polyimide as a binder. The stage (base stand) 83 is a circular stand on whose upper surface the filter member 30 that is the object of cutting is placed; this stage 83 is free to rotate about a central axis AX that extends in the vertical direction, and can be moved horizontally in any desired direction.

In order to cut a filter member 30 by means of this dicing saw 80, the filter member 30 is first bonded to a stage glass 84 by means of a hot-melt wax, and the stage glass 84 is then attached to the surface of the stage 83 by vacuum suction. Then, the rotating shaft 82 is driven so that the blade 81 is caused to rotate at approximately 30,000 rpm (this rpm is varied according to material of the blade 81 and the cutting conditions at the cutting surface of the filter member 30), and the stage 83 is caused to move at a feeding speed of approximately 1 to 5 mm/sec, so that the filter member 30 is cut. In this case, furthermore, the system is adjusted so that the edge of the blade 81 cuts into the upper surface of the stage glass 84 to a depth of approximately 0.1 to 0.3 mm as shown in FIG. 6 (the cut-in depth is indicated by d in FIG. 6), and cutting is accomplished by downcutting with the feed direction of the stage 83, i.e., the base glass 84, set in the same direction as the direction of rotation of the blade 81.

Figure 6:
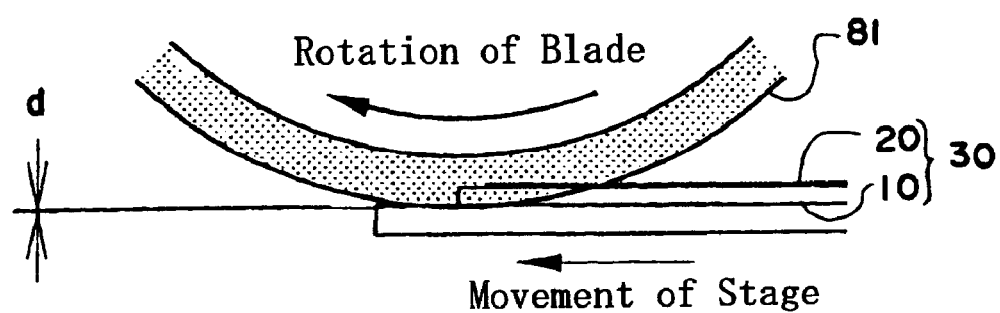
FIG. 6 is a diagram which shows how the filter member is cut by downcutting using the above-mentioned dicing saw.

Furthermore, in this cutting, in cases where the filter film 20 formed on the filter member 30 is an optical multi-layer film, the filter member 30 is always placed on the stage 83 so that the filter film 20 (optical multi-layer film) is on the side of the upper surface (see FIG. 6). Here, if the filter film 20 is positioned on the side of the undersurface (i.e., the side that contacts the base glass 84), the filter film 20 will peel and show relatively severe chipping and cracking when the blade 81 is caused to cut into the filter member 30. However, if the filter member 30 is placed on the stage 83 so that the filter film 20 is positioned on the side of the upper surface, and the system is devised so that downcutting is performed, the above-mentioned chipping and peeling can be conspicuously reduced.

Furthermore, in cases where an anti-reflection film, etc., is disposed on the opposite surface of the glass substrate 10 from the surface on which the filter film (optical multi-layer film) 20 is formed, this anti-reflection film contacts the base glass 84. Such an anti-reflection film generally has a smaller thickness than the optical multi-layer film. For example, filter films used in optical communications require extremely precise transmission (reflection) characteristics with respect to wavelength; accordingly, the total number of film layers required in order to satisfy such a requirement may reach several tens of layers. On the other hand, a few layers are sufficient in the case of an anti-reflection film; accordingly, the likelihood of peeling is much lower in the anti-reflection film than in the filter film. Accordingly, even if cutting is performed in such a state, there is little danger that chipping or peeling, etc., will occur in the anti-reflection film.

Figure 7:
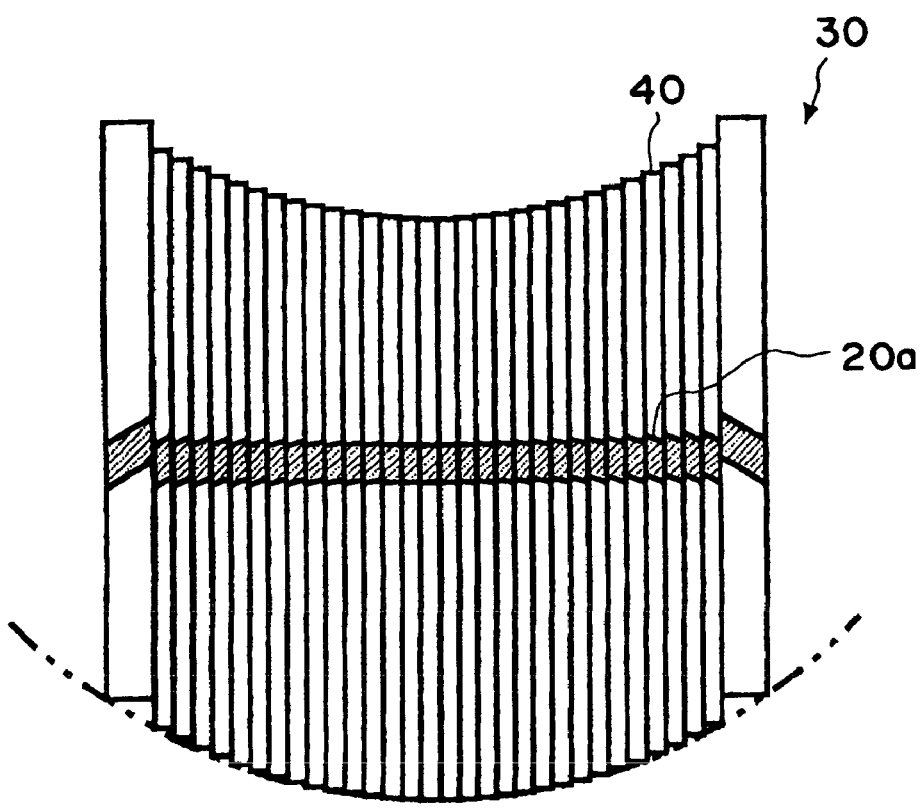
FIG. 7 is a diagram showing a state in which the small filter member pieces have been rearranged so that the filter films with good characteristics in the small filter member pieces are lined up in a more or less rectilinear pattern.

When the filter member 30 is thus cut into a plurality of small filter member pieces 40, 40, . . . , an amount of glass equal to the thickness of the blade 81 of the dicing saw 80 is removed from the original glass substrate 10, so that gaps of a very small width are generated between the respective small filter member pieces 40, 40, . . . . In order to eliminate these gaps, the filter member 30 following cutting is heated so that the wax is softened, and the entire assembly of the small filter member pieces 40, 40, . . . is compressed from both sides to produce a state in which such gaps are not generated. Then, the small filter member pieces 40, 40, . . . are rearranged so that the filter films 20a, 20a, . . . with good characteristics in the small filter member pieces 40, 40, . . . are lined up in a more or less rectilinear pattern as shown in FIG. 7, and these small filter member pieces 40, 40, . . . are then re-bonded by means of a hot-melt wax.

Figure 8:
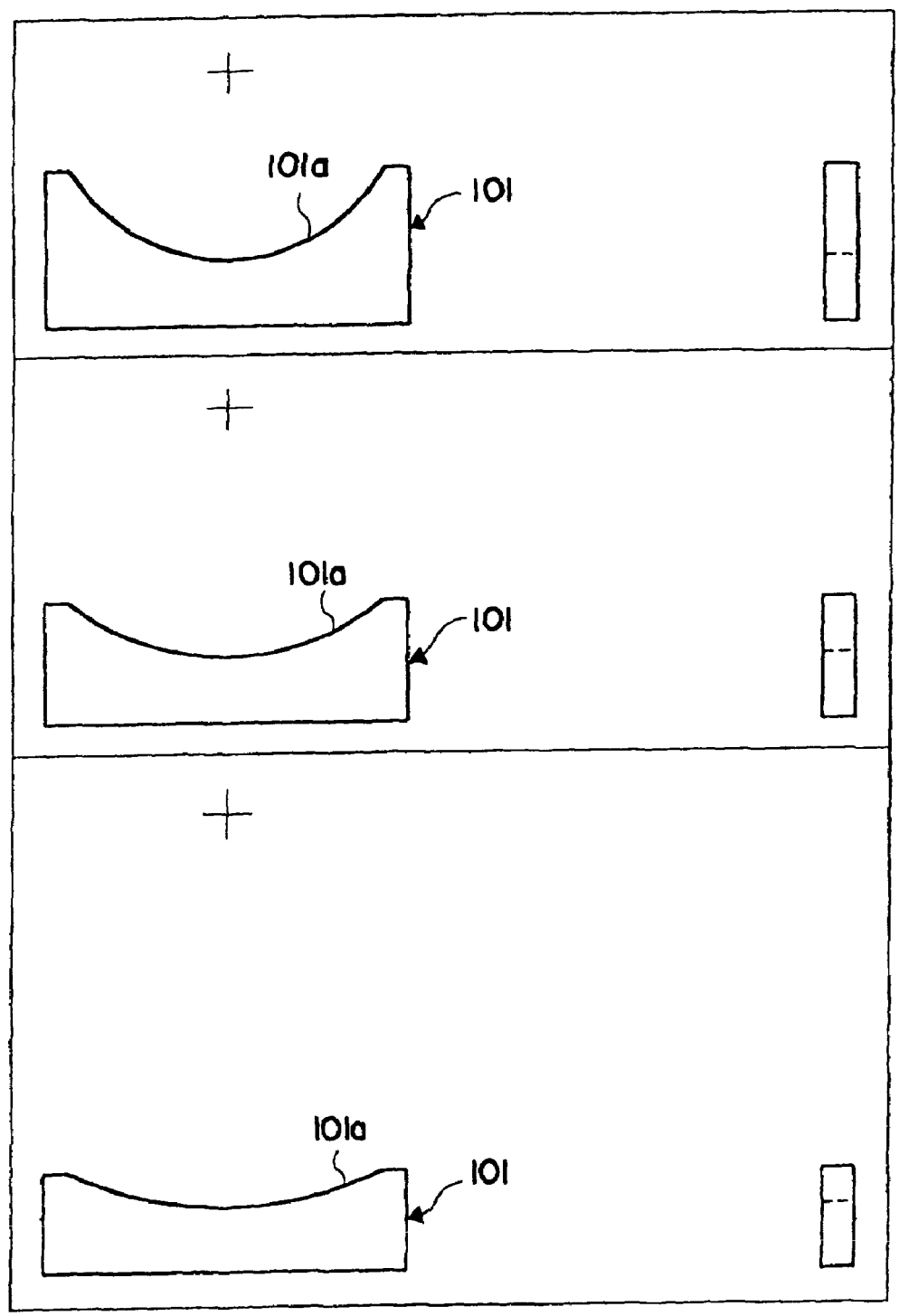
FIG. 8 shows an example of the tool used to rearrange the small filter member pieces; this figure shows a front view and a side view.

Here, it is desirable to use a tool 101 of the type shown in FIG. 8 in order to rearrange the above-mentioned small filter member pieces 40, 40, . . . . This tool 101 consists of a plate-form member, each having a recessed part 101a on one side. In order to rearrange the small filter member pieces 40, 40, . . . using such a tool 101, the lower ends of the respective small filter member pieces 40, 40, . . . that have been compressed as described above are caused to contact the recessed part 101a of the tool 101. Here, if the curvature radius of the new arc formed by the filter films 20a, 20a, . . . that are present on the small filter member pieces 40, 40, . . . in a state in which these small filter member pieces are compressed so that the cutting margins are eliminated more or less agrees with the curvature radius of the recessed part 101a of the tool 101 that is used, the filter films 20a, 20a, . . . following rearrangement will be lined up in a more or less rectilinear pattern.

Furthermore, the new arc formed by the filter films 20a, 20a, . . . present on the small filter member pieces 40, 40, . . . in the state in which these small filter member pieces 40 are compressed as described above is not a circular arc like the initial arc, but is rather an elliptical arc; for practical purposes, however, this may be viewed as a circular arc. Furthermore, it would also be possible to select a tool 101 which has a recessed part 101a with more or less the same curvature radius as the curvature radius of the circular arc obtained by analyzing this new arc from a plurality of tools 101 with recessed parts 101a having different curvature radii that have been prepared beforehand. The plurality of tools 101 shown in FIG. 8 consist of three tools 101 whose recessed parts 101a thus have different curvature radii. Furthermore, the "+" symbols in the figure indicate the positions of the centers of the curvature radii of the recessed parts 101a in the respective tools 101.

Figure 9:
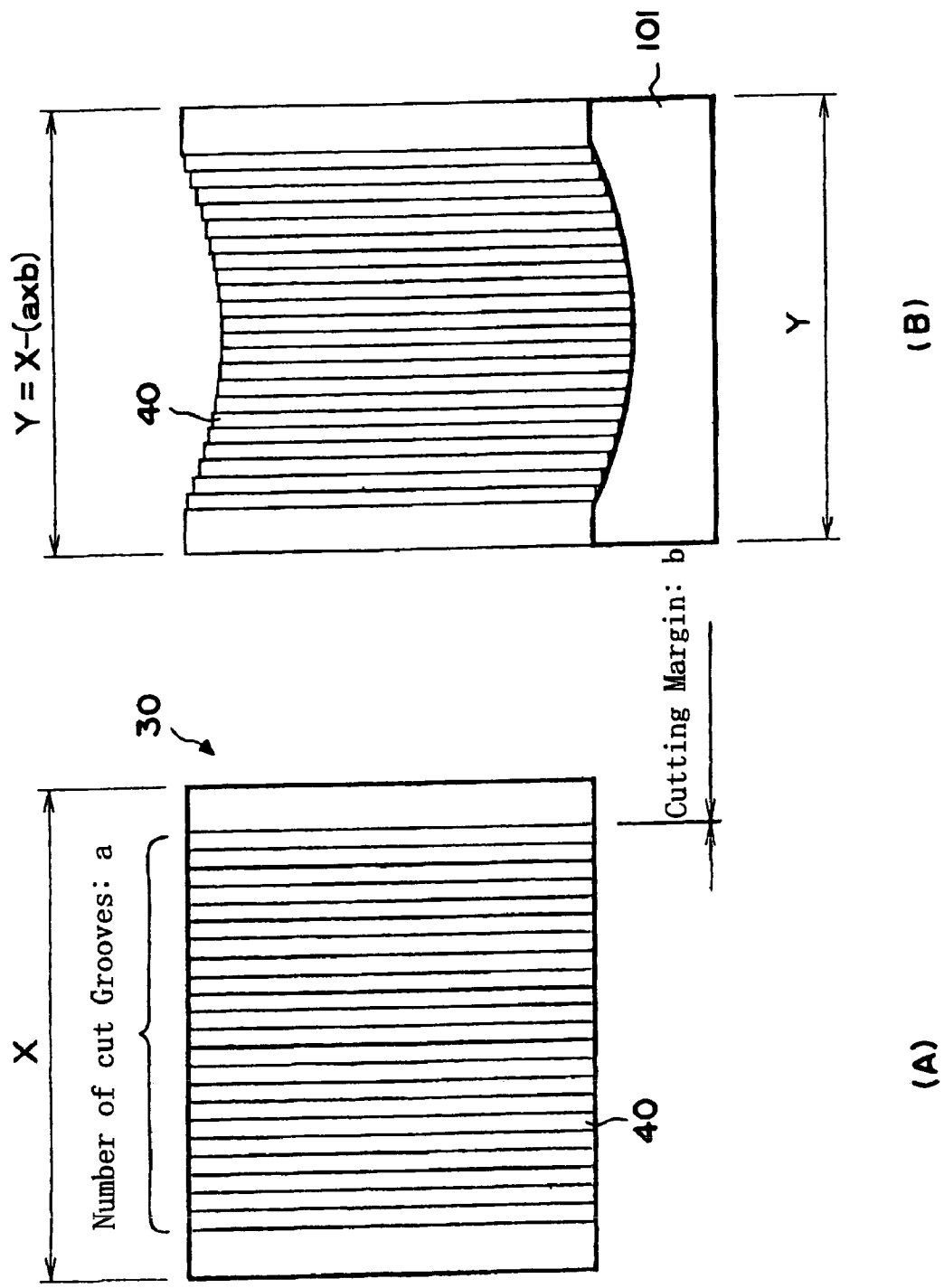
FIG. 9 shows the small filter member pieces.

Here, as is shown in FIG. 9(A), in a case where the width of the original filter member 30 is X, and "a" cutting margins with a width of "b" are formed following cutting by means of the blade 81 (i.e., where the number of cut grooves is a and the cutting margin is b), the overall width of the small filter member pieces 40, 40, . . . following compression is $Y=X-(a \times b)$. If the width of the tool 101 is set at Y as shown in the figure, then the center positions of the small filter member pieces 40, 40, . . . following rearrangement can be positioned on the center line in the recessed part 101a of the tool 101 by aligning both end portions of the compressed small filter member pieces 40, 40, . . . with both ends of the tool 101, so that distortion of the overall assembly of small filter member pieces 40, 40, . . . following rearrangement can be eliminated, and filter films 20a, 20a, . . . with good characteristics can be securely lined up in a rectilinear pattern.

Figure 10:
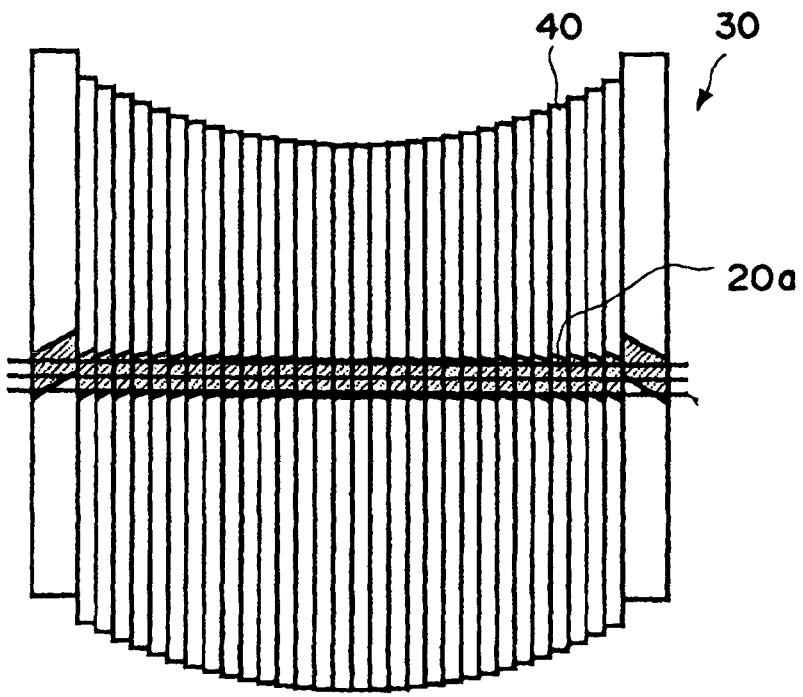
FIG. 10 is a diagram which shows how the rearranged small filter member pieces are cut in the direction perpendicular to the cutting direction used in the initial cutting process.
Figure 11:
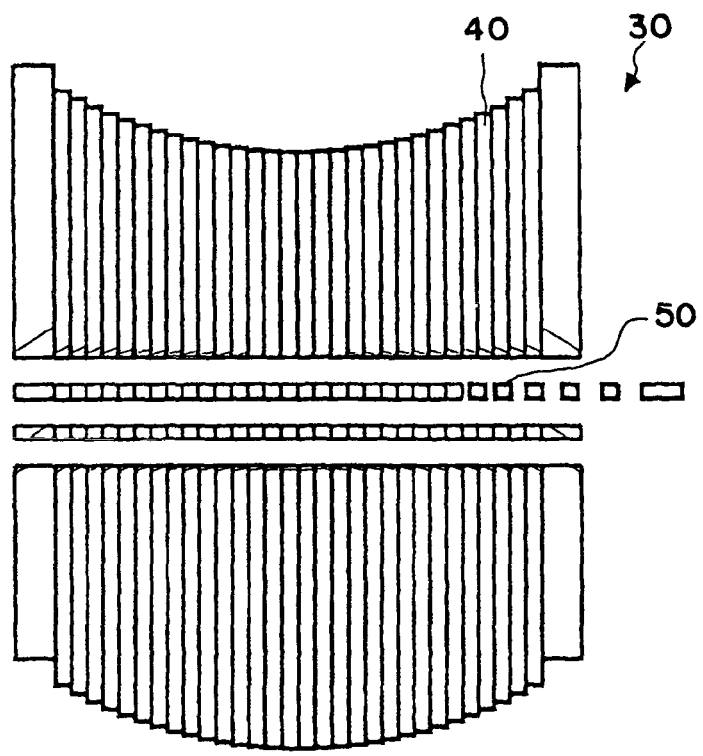
FIG. 11 is a diagram which shows how filter chips in which a filter film with good characteristics is used as the filter part are obtained.

When the rearrangement of the small filter member pieces 40, 40, . . . has been completed in this way, these small filter member pieces 40, 40, . . . are cut in the direction perpendicular to the cutting direction used in the above-mentioned initial cutting process (see FIG. 10). As a result, desired filter chips 50, 50, . . . which have filter films 20a, 20a with good characteristics as filter parts are obtained (see FIG. 11).

In cases where a circular arc form filter film with good characteristics is merely cut into a checkerboard pattern in order to obtain filter chips, as in the above-mentioned conventional method, the portion of the filter film with good characteristics that is not cut out as filter chips is large, so that the yield drops. However, if the present filter chip cut-out method is used, such waste is greatly reduced, so that filter chips 50, 50, . . . can be cut out with good efficiency, and the yield can be improved.

Incidentally, in cases where a plurality of rectangular glass substrates 10 are disposed as shown above in FIG. 2 in the manufacture of filter members 30 by forming filter films 20 on glass substrates 10, no glass substrate is present in some of the regions where it would inherently be possible to form a filter film with good characteristics (i.e., the arc-form regions S1 through S3 shown in FIG. 2); accordingly, filter chips cannot be obtained from these portions, so that there is an increased amount of waste.

In order to correct such waste and allow the utilization of all of the filter film areas with good characteristics, it is desirable to form all of a filter film 120 that is formed in an annular shape on the surface of a single glass substrate 110 as shown in FIG. 12. In this case, the glass substrate 110 may be rectangular as long as this substrate is large enough to contain all of the annular filter film 120; however, it is desirable that this glass substrate 110 be a disk-form substrate as shown in FIG. 12.

When a disk-form substrate of the type described above is used as the glass substrate 110, the system is arranged so that the center of this disk more or less coincides with the center of the rotating shaft 3 of the substrate holder 2. Furthermore, it is advisable to form a hole H in the central portion, and to dispose a monitoring glass 111 that monitors the conditions of film formation in this position as shown in FIG. 12. Furthermore, it is desirable that the thickness of the glass substrate 110 be greater than the final finished dimension. The reason for this is that there are cases in which warping occurs in the glass substrate 110 as a result of film stress in the filter film 120 formed on the glass substrate 110, and occurrence of such warping in the glass substrate 110 due to film formation can be prevented if such an approach is used. Furthermore, the glass substrate 110 can be adjusted to the desired thickness by planing following film formation.

In a case where filter chips are cut out from a filter member 130 in which all of an annular filter film 120 with good characteristics is thus formed on a single glass substrate 110, it is clear that the number of filter chips that can be cut out is increased compared to a case in which a plurality of the above-mentioned rectangular glass substrates 10 are used. Below, a procedure in which filter chips are cut out from such a filter member 130 in which a filter film 120 is formed on a single glass substrate 110 will be described using a case in which the filter member 130 is a disk-form filter member as an example.

In this case, the disk-form filter member 130 is first mounted on the stage 83 of the above-mentioned dicing saw 80 using a hot-melt wax or a commercially marketed UV sheet of the type used in the cutting of semiconductor wafers, etc., and this filter member 130 is cut into eight equal parts by means of the rotating blade 81 as shown in FIG. 13(A), thus producing new filter members 130a, 130a, . . . (see FIG. 14). Alternatively, the filter member 130 may also be cut into six, four, twelve or ten equal parts as shown in FIGS. 13(B) through 13 (E).

In any case, it is advisable to arrange the system so that new filter members 130a, 130a, . . . that have the same shape are obtained. This is done so that the tool 201 that is used to rearrange the small filter member pieces 140, 140, . . . (described later) can be used in common for all of the small filter member pieces 140, 140, . . . . Furthermore, the optimal number of parts into which the filter member 130 is divided depends on the radius of the annular filter film 120 and the dimensions of the glass substrate 110, etc. Moreover, with consideration being given to the subsequent cutting and rearrangement of the small filter member pieces 140, 140, . . . , either the outer circumferential portion or inner circumferential portion of the filter member 130 may be cut away to form the member into a rectilinear shape.

Furthermore, if the outer circumferential portions of the filter members 130a are cut away as shown in FIG. 15, this cutting away of the outer circumferential portions may be performed at the same time as the above-mentioned cutting into parts. Alternatively, polygonal members that have been cut from the outset may also be used.

Next, the necessary number of small filter part members 140, 140, . . . are obtained by cutting the filter member 130 in the direction perpendicular to the chord that connects both ends of the circular arc form portion of the filter film 120 with good characteristics as shown in FIG. 16. Here, furthermore, in order to facilitate the cutting of the fan-shaped filter member 130, it is desirable that dummy glasses 181 and 182 that have a more or less triangular shape (the approximate triangles ABC and A'B'C' shown in the figure) be attached to both the left and right side parts of the filter member 130.

Next, the filter member 130 following this cutting is heated so that the hot-melt wax is softened, and the entire assembly of the small filter member pieces 140, 140, . . . is compressed from both sides so that the cutting margin of the blade 81 caused by cutting is eliminated, thus producing a state in which the above-mentioned gaps are not generated. Then, after the small filter member pieces 140, 140, . . . have been rearranged so that the filter films 120a, 120a, . . . with good characteristics in the respective small filter member pieces 140, 140, . . . are lined up in a more or less rectilinear pattern as shown in FIG. 17, the small filter member pieces 140, 140, . . . are re-bonded by means of the hot-melt wax.

In this case, it is advisable to use a tool 201 of the type shown in FIG. 18 for the rearrangement of the above-mentioned small filter member pieces 140, 140, . . . . This tool 201 also consists of a plate-form member, and has a projecting part 201a on one side (the "+" symbol in FIG. 18 indicates the center of the curvature radius of the projecting part 201a of the tool 201). Then, for example, in order to rearrange the small filter member pieces 140, 140, . . . shown in FIG. 16 using such a tool 201, the lower ends of the respective compressed small filter member pieces 140, 140, . . . are caused to contact the projecting part 201a of the tool 201.

Here as well, if the curvature radius of the new arc formed by the filter films 120a, 120a, . . . with good characteristics present on the small filter member pieces 140, 140, . . . in a state in which these small filter member pieces have been compressed so that the cutting margins are eliminated more or less agrees with the curvature radius of the projecting part 201a of the tool 201 that is used, the filter films 120a, 120a, . . . will be lined up in a more or less rectilinear pattern following rearrangement.

Similarly, furthermore, the new arc formed by the filter films 120a, 120a, . . . present on the small filter member pieces 140, 140, . . . in the above-mentioned compressed state is not a circular arc like the initial arc, but is rather an elliptical arc; for practical purposes, however, this may be viewed as a circular arc. Furthermore, it would also be possible to select a tool 201 which has a projecting part 201a with more or less the same curvature radius as the curvature radius obtained by analyzing this new arc from a plurality of tools 201 with projecting parts 201a having different curvature radii that have been prepared beforehand.

Next, the small filter member pieces 140, 140, . . . that have been rearranged and re-bonded are cut in the direction perpendicular to the cutting direction used in the above-mentioned initial cutting process (see FIG. 19), thus producing the desired filter chips 150, 150, . . . which have filter films 120a, 120a, . . . with good characteristics as filter parts (see FIG. 20). Thus, filter chips 150, 150, 150, . . . can be cut out with good efficiency by effectively utilizing the filter film 120 with good characteristics that is formed in an annular shape.

Furthermore, in this case as well, if the filter film 120 is an optical multi-layer film, the filter member 130 is placed on the stage 83 so that the filter film 120 (optical multi-layer film) is on the side of the upper surface, and cutting is accomplished by downcutting using the dicing saw 80. In this way, chipping and peeling that accompany cutting can be conspicuously reduced as in the above-mentioned embodiment.

Furthermore, in the case of such a filter member cutting method, a production process can be employed in which a filter member 30 (or 130) is manufactured by forming an optical multilayer film on a glass substrate 10 (or 110), and then obtaining filter chips 50 (150) by cutting these chips out from this filter member 30 (130). Accordingly, it is not absolutely necessary to use a working method in which optical multi-layer films are formed on glass substrates that have been cut out to specified dimensions beforehand as in conventional techniques, so that the productivity of the optical multi-layer films can be greatly improved.

Furthermore, the glass substrate 110 on which the filter film 120 with good characteristics is formed in an annular shape need not necessarily be a disk-form substrate of the type described above (for example, a rectangular substrate may also be used); however, if the glass substrate 110 is a more or less disk-form substrate as described above, the waste glass portion that is cut away by the cutting process can be reduced from the outset, so that the manufacturing cost can be lowered.

Preferred embodiments of the present invention have been described above; however, the scope of the present invention is not limited to the above-mentioned embodiments. For example, in the above-mentioned embodiments, a blade saw was used to cut the filter members. However, the saw used to cut the filter members is not limited to a blade saw; some other cutting mechanism such as a wire saw may also be used. Furthermore, it goes without saying that the above-mentioned cutting method used in cases where the filter film is an optical multi-layer film is always effective not only in cases where cutting is performed for the purpose of obtaining filter chips from the filter member as described above, but also in cases where filter members are cut in which a filter film consisting of an optical multi-layer film is formed on one side of a glass substrate.

INDUSTRIAL APPLICABILITY

The present invention can be used to manufacture optical filters containing optical multilayer films with good productivity.

What is claimed is:

1. A filter chip cut-out method for cutting out a plurality of filter chips from a filter member in which portions of a filter film formed on a substrate that have desired characteristics constitute a circular arc form region, wherein the method comprises a first step in which a plurality of filter member pieces are obtained by cutting the filter member in a direction perpendicular to a chord of the circular arc, a second step in which the plurality of filter member pieces are rearranged so that the portions of the plurality of filter member pieces that correspond to the circular arc form region are lined up in a rectilinear pattern, and a third step in which a plurality of filter chips are obtained by cutting the rearranged plurality of filter member pieces in a direction perpendicular to a direction of cutting in the first step.

2. The filter chip cut-out method according to claim 1, wherein the rearrangement of the filter member pieces is performed in the second step using a tool which has a projecting or recessed part that has the same curvature radius as the curvature radius in the circular arc form region.

3. A filter chip manufacturing method comprising a first step in which a filter member is obtained using a film forming apparatus in which a filter film that has desired characteristics is formed in an annular shape, with a substrate being positioned throughout an entire region in which the filter film that has desired characteristics is formed, a second step in which the filter member including at least a portion of an annular region constituting the filter film that has desired characteristics is cut through a center of a curvature radius of the annular region so that the filter member is divided into a plurality of filter members in which the filter film that has desired characteristics is present in a circular arc form pattern, a third step in which a plurality of filter member pieces are obtained by cutting the filter members obtained in the second step in a direction perpendicular to a chord of the circular arc, a fourth step in which the plurality of filter member pieces are rearranged so that portions of the plurality of filter member pieces that correspond to the circular arc form region are lined up in a rectilinear pattern, and a fifth step in which a plurality of filter chips are obtained by cutting the rearranged plurality of filter member pieces in a direction perpendicular to a cutting direction in the third step.

4. The filter chip manufacturing method according to claim 3, wherein the substrate has a disk-form shape.

5. The filter chip manufacturing method according to claim 3 or claim 4, wherein the rearrangement of the filter member pieces is performed using a tool which has a projecting or recessed part that has the same curvature radius as the curvature radius of the circular arc form region.

* * * * *